Oct. 8, 1957 — A. F. HUDSON — 2,808,637
PYRAMIDAL TOOL AND HOLDER
Filed Nov. 23, 1953
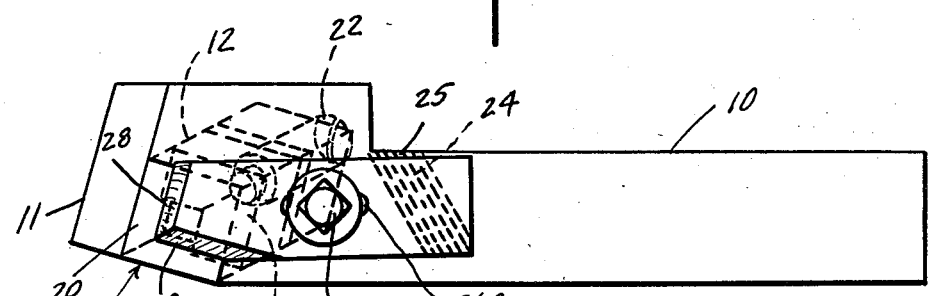
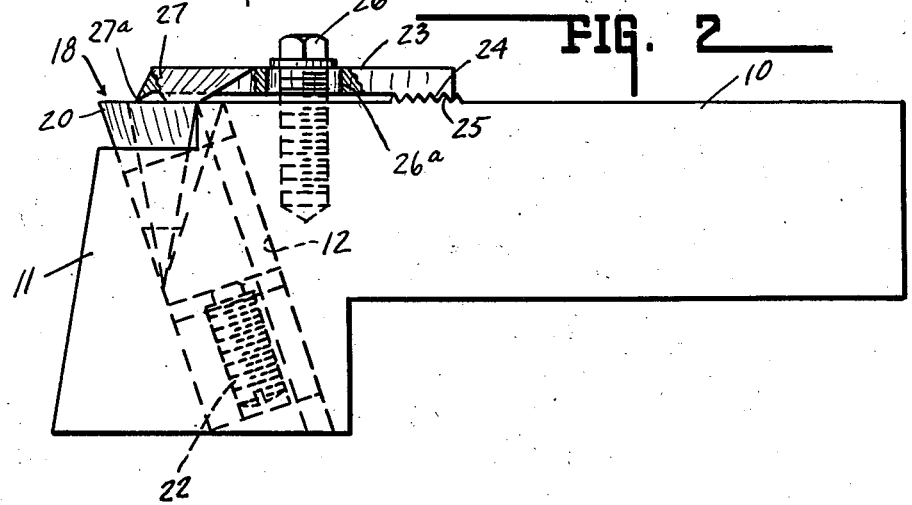
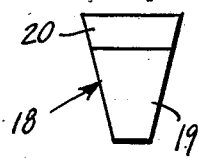
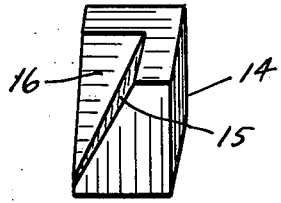
INVENTOR.
ARTHUR F. HUDSON,
BY
Lockwood, Galt, Woodard & Smith,
ATTORNEYS.

United States Patent Office 2,808,637
Patented Oct. 8, 1957

2,808,637

PYRAMIDAL TOOL AND HOLDER

Arthur F. Hudson, Huntington, Ind.

Application November 23, 1953, Serial No. 393,661

1 Claim. (Cl. 29—96)

This invention relates generally to metal cutting tools and more particularly to a tool having a plurality of cutting edges, together with a holder adapted to hold such a tool.

Conventional carbide cutting tools are provided with a steel shank portion and a carbide insert adapted to be mounted at the end of the steel shank to present a cutting edge for metal turning or other metal cutting operations. Such conventional tools are useable until the single cutting edge becomes dull, at which time the tool must be removed and re-sharpened. The sharpening period constitutes a time loss with respect to the useful life of the tool, and the number of re-sharpening operations is limited to the extent that only a portion of the carbide insert can be used. That is to say, it would be highly desirable if a greater percentage of the carbide insert could be used, thereby providing a greater number of useful cycles of actual use of the tool.

Another conventional carbide cutting tool consists of an insert which may be mounted within a tool holder in a tilted, broached holder, the end of the holder being arranged to clamp the insert with one end thereof projecting from the tool holder at a conventional clearance angle. These inserts are cylindrical or elongated and triangular in cross section or of rectangular cross section. Inserts of this type permit repeated grinding, thereby to provide relatively long useful life. However, it is intended that they may be rotated to present one cutting point after another, and because of this fact the chip-receiving face of the insert must lie at an angle of ninety degrees with respect to the longitudinal outer surfaces of the inserts. By providing this ninety degree relationship, the tool may be rotated. On the other hand, this type of insert can not be ground to change the slope or back rake or side rake of the chip receiving surface, and still permit rotation of the tool. In other words, when the chip-receiving surface lies at any other angle than ninety degrees with respect to the side surfaces of the insert, the insert can not be rotated to present one cutting point after another.

Another limitation on conventional carbide cutting tools is that with respect to the grinding of chip breaking or rolling surfaces on the carbide insert. When the chip breaker or roller is an integral part of the carbide insert, a substantial amount of carbide must be removed whenever the insert is ground so that a new cutting point may be formed, and a new chip breaker or roller must be formed in proper relation to the new cutting edge or point.

Accordingly it is the principal object of this invention to provide a carbide tool bit having a plurality of useful cutting edges and of such character that the tool bit may be rotated to present different cutting surfaces without altering the angle of back rake or side rake of the chip receiving surface.

Another object of this invention is to provide a tool bit having a plurality of cutting surfaces or edges and a holder to cooperate therewith in such a manner that the tool bit may be adjusted to present one cutting edge after another without altering the back rake or side rake of the chip receiving surface.

Still another object of this invention is to provide a chip breaker or roller adapted to cooperate with a tool bit and holder having the characteristics described in the foregoing objects.

In accordance with this invention there is provided a metal cutting tool assembly comprising a tool bit having such geometrical form that it includes a plurality of useful cutting edges and that it may be rotated to present one cutting edge of another without altering the back rake or side rake of the chip receiving surface.

In accordance with another feature of this invention there is provided a metal cutting tool assembly comprising a tool bit having a plurality of useful metal cutting edges, a tool holder of such character that the tool bit may be rotated or otherwise adjusted to present one cutting edge after another without altering the back rake or side rake of the chip receiving surface, and a chip breaker or roller attached to said tool holder in operative relation to the chip receiving surface of said tool bit.

The full nature of the invention will be understood from the accompanying drawings and the following description and claim:

Fig. 1 is a top plan view of the metal cutting tool assembly.

Fig. 2 is a front elevation view of the metal cutting tool assembly illustrated in Fig. 1.

Fig. 3 is a front elevation view of the tool bit shown in Figs. 1 and 2.

Fig. 4 is a perspective view of the tool bit supporting block illustrated in Figs. 1 and 2.

In accordance with this invention there is provided a metal cutting tool assembly comprising a holder 10 generally conventional in external form and of the type adapted to be mounted in the tool post of a metal cutting lathe. Tool holder 10 includes a head portion 11 which has formed therein a rectangular hole 12 for receiving a rectangular wedge block 14. The block 14 is formed to provide two wedge surfaces 15 and 16, each of which is disposed at an angle to the longitudinal axis of the block.

The purpose of hole 12 and block 14 is to support the multi-edged tool bit 18 which comprises a steel base portion 19 and a carbide insert 20, the tool bit as a whole having a 4-sided pyramidal form. While the tool bit is illustrated as having this particular form, it will be obvious to those skilled in the art that the bit may be polyhedral and have three or five, or any other number of sides as can be determined by the requirements of a particular cutting operation.

Because of the generally pyramidal form of the tool bit and the correlated angularity of the wedge surfaces 15 and 16 of block 14, the cutter bit may be supported to present any one of the four corners of carbide insert 20 for performing a cutting operation. Furthermore, rotation of the cutter bit to present one corner after another does not change the cutting angle of the tool bit with respect to the work piece. Again, this is because of the fact that wedge surfaces 15 and 16, together with the angular relationship of hole 12, always support the cutting edge of the tool bit at the same angle with respect to the surface of the work piece.

Further because of the general pyramidal form of the tool bit and the correlated angularity of the wedge surfaces 15 and 16 of block 14, the tool bit may be rotated to present one corner after another without changing the back rake or side rake of the chip receiving surface. In prior art carbide inserts the chip receiving surface lies at a right angle to the longitudinal surfaces of the bit. This is not the case where the tool bit is formed in a generally pyramidal form. Hence, a tool bit may be ground to have whatever angle of back rake and side rake that may be required for cutting a particular metal. For example, these angles are usually different for cutting iron than they are for cutting metals such as aluminum or magnesium.

The block 14, together with the tool bit 18, is slidably adjustable within hole 12. For supporting the block 14 and tool bit 18 within hole 12 and adjusting the vertical position of these elements, there is provided a set screw 22 threaded in the base portion of head 11 and rotatable by a screwdriver inwardly and outwardly thereof for adjusting the said elements.

For holding the tool bit 18 in a downward direction in firm contact with the block 14, there is provided a hold-down clamp 23, the forward end of which may engage the upper surface of the carbide insert 20 and the rear end of which may bear on the tool holder 10. In order to provide firm anchorage of clamp 23, its lower surface may be serrated as at 24, while the upper surface of tool holder 10 may be correspondingly serrated as at 25. These serrations are illustrated as being relatively coarse, but in order to adjust the clamp 23 to a fine degree with respect to the cutting edge of the tool, these serrations should be relatively fine. The purpose of this will appear from the subsequent description. For holding the clamp 23 in firm engagement at its respective ends with the tool bit 18 and the tool holder 10, there is provided a stud bolt 26 threaded in tool holder 10. In order to provide adjustment of the clamp 23 lengthwise of the tool holder, an elongated slot 26a is provided in clamp 23.

The clamp 23 may also be provided with a chip breaking end 27, surfaces 28 and 29 of which may be formed to provide a chip breaker or a chip roller, as desired. In order to prevent chips from being forced beneath the end of chip breaking surfaces 28 or 29, the clamp 23 is formed at end 27 with a fine line bearing surface 27a whereby the pressure per unit area between 27a and the upper surface of tool bit 18 may be extremely high and thereby prevents chips from being forced under surface 27a.

In operation the tool bit 18 may be sharpened to provide cutting edges at its corners. A tool bit may be mounted in the head 11 of tool holder 10 to present one corner of the carbide insert 20 for cutting the surface of a work piece. When this particular corner or cutting edge becomes dull, the clamp 23 may be loosened and the cutter bit removed so that it may be rotated to present a second corner for cutting the surface of the work piece.

The cutter bit may be used in this fashion until all of its cutting corners have become dull, at which time it may be resharpened at each corner for further use. In this way a single cutter bit may be used for a greatly increased length of time between sharpening operations. This reduces the total number of cutter bits required for a given metal working machine. A further advantageous result is the fact that a greater quantity of a carbide cutter bit may be utilized for effective cutting due to the fact that all corners of the carbide insert are useable in a cutting operation. While the invention has been described and illustrated as used in a tool holder for metal turning machines, it will be obvious to those skilled in the art that this invention may be adapted to use in tools for all types of metal working machines. It will further be apparent that while the illustrated embodiment of the invention includes a pyramidal cutting bit having four sides, the cutter bit may be formed equally well with three sides or more than four sides, depending upon the particular application in which the cutter bit may be used.

While the cutter bit disclosed in Fig. 3 has been illustrated as including a steel base portion 19 and a carbide insert 20, it will be obvious to those skilled in the art that the entire tool bit may be composed of carbide material.

The tool bit 18 has also been disclosed as having a top surface lying in a plane 90° displaced from the longitudinal axis of the tool bit. It will be readily apparent that the top surface may be ground at each corner to provide a particular back rake and side rake, depending upon the particular type of metal to be cut. If each corner of the top surface is so ground, the various surfaces of the bit adjacent to the particular corner will always have the same angular relationship to the work piece because of the pyramidal configuration of the tool bit. In other words, when the bit is rotated from one corner to another, the clearance angles remain identical as between each cutting corner and the work piece.

The drawings illustrate the top surface of the tool bit as being parallel to the top surface of the tool holder. It will be further obvious to those skilled in the art that the block 14 may be fashioned to provide three or four tool bit engaging surfaces, thereby to displace the longitudinal axis of the tool bit at an angle with respect to the longitudinal axis of the broached hole 12. Again, the pyramidal tool bit can be rotated to present one corner thereof after another to the work piece, maintaining the angular relationships of the various surfaces of the tool bit in constant relation to the work surface.

The invention claimed is:

A metal cutting tool assembly comprising a tool bit of pyramidal form, the base section thereof comprising a tool carbide insert and the peak portion of said bit comprising a steel support for said insert, and a tool holder for said bit comprising a head having formed therein a rectangular hole, the axis of which is tilted with respect to the axis of said head, a block within said hole formed with a wedge portion for receiving the pyramidal end of said tool bit, an adjustable supporting screw in the base of said head engaging said block, and a hold-down member clamped to said tool holder and engaging the bit on the surface of said insert to hold said bit, and therewith said block, in engagement with said screw.

References Cited in the file of this patent

UNITED STATES PATENTS

| | | |
|---|---|---|
| 1,459,805 | Tasker | June 26, 1923 |
| 1,542,007 | Schroeder | June 16, 1925 |
| 1,838,520 | Archer | Dec. 29, 1931 |
| 2,087,814 | Rawlings | July 20, 1937 |
| 2,378,094 | Numes-Vaz | June 12, 1945 |
| 2,414,811 | Hollis | Jan. 28, 1947 |
| 2,457,469 | Hillman | Dec. 28, 1948 |
| 2,598,581 | McKenna et al. | May 27, 1952 |
| 2,623,272 | Greenleaf | Dec. 30, 1952 |
| 2,644,224 | Chilcott et al. | July 7, 1953 |
| 2,659,962 | Doerseln | Nov. 24, 1953 |
| 2,680,897 | Murphy | June 15, 1954 |
| 2,683,302 | Bader | July 13, 1954 |
| 2,697,866 | Greenleaf | Dec. 28, 1954 |

FOREIGN PATENTS

| | | |
|---|---|---|
| 271,208 | Great Britain | May 26, 1927 |